United States Patent [19]
Lodder

[11] 3,833,775
[45] Sept. 3, 1974

[54] UNDERFLOOR POWER SUPPLY SYSTEM FOR A VEHICLE

[75] Inventor: Adolf E. Lodder, Montreal, Quebec, Canada

[73] Assignee: Dominion Bridge Company Limited, Montreal, Quebec, Canada

[22] Filed: Aug. 7, 1972

[21] Appl. No.: 278,210

[30] Foreign Application Priority Data
July 5, 1972  Canada .............................. 146425

[52] U.S. Cl............................................. 191/12 R
[51] Int. Cl............................................. H02g 11/00
[58] Field of Search ............ 191/1, 2, 12 R, 22, 23, 191/25, 28, 29, 30, 31, 45, 48, 49

[56] References Cited
UNITED STATES PATENTS

| | | | |
|---|---|---|---|
| 650,997 | 6/1900 | Taylor................................. | 191/25 |
| 1,010,504 | 12/1911 | Lindsley.............................. | 191/31 |
| 2,042,105 | 5/1936 | Kelley................................. | 191/25 |
| 2,316,064 | 4/1943 | Hans................................... | 191/25 |
| 2,725,431 | 11/1955 | Rushworth......................... | 191/12 R |

*Primary Examiner*—M. Henson Wood, Jr.
*Assistant Examiner*—D. W. Keen
*Attorney, Agent, or Firm*—Fetherstonbaugh & Co.

[57] ABSTRACT

A trench in a floor parallels the path of movement of a vehicle along the floor, the trench being covered by a series of floor plates. A trolley moves alongside of the vehicle on rails in the trench and a hump on the trolley successively raises the floor plates above floor level. A power supply in the trench is connected to a power conduit on the trolley and the conduit projects through a space between the floor and the raised floor plates to supply power to the accompanying vehicle.

11 Claims, 4 Drawing Figures

UNDERFLOOR POWER SUPPLY SYSTEM FOR A VEHICLE

This invention relates to new and useful improvements in systems for supplying power to a vehicle which moves in a predetermined path along a floor. The principles of the invention are applicable to numerous different environments, one of which may be mentioned by way of an example as being that of a large electric welding machine or manipulator which moves along a floor track in order to reach different work stations.

In conventional practice the electric power for such a welding manipulator was supplied either by a cable carrier mounted on the floor, or by an overhead pick-up. In the first instance the cable carrier occupied valuable floor space, and in the second instance the overhead pick-up restricted the use of overhead cranes.

The principal object of this invention is to eliminate the above outlined disadvantages of conventional power supply systems, this being attained by the provision of an underfloor power supply system which for most part is contained in a trench in the floor, the trench being covered by metal plates. Thus, the floor is flat and unobstructed, and the power supply system is protected against dirt and mechanical damage.

An important feature of the invention resides in a trolley which moves alongside the welding manipulator on rails in the trench and has a hump which successively raises the trench covering plates above floor level as the trolley moves along the rails. A cable carrier or a power pick-up in the trench is connected to a conduit on the trolley and the conduit projects through a space between the floor and the raised plates to supply power to the accompanying manipulator.

In the instance of a welding manipulator or some other electrical machine, the power supply is electric current delivered through cables, conduits or other conductors. However, in instances of hydraulically or pneumatically operated machines, the power supply may be hydraulic fluid or compressed air delivered through conduits such as pipes and flexible hoses. Also, while the invention is primarily concerned with supply of power to a vehicle, it may also be used for other purposes such as maintaining connections between a stationary control panel and different control circuits on the vehicle, or for circulating cooling fluid through a heat exchanger on the vehicle, and for many other similar uses.

With the foregoing more important object and features in view and such other objects and features which may become apparent as this specification proceeds, the invention will be understood from the following description taken in conjunction with the accompanying drawings, in which like characters of reference are used to designate like parts and in which.

Figure 3:
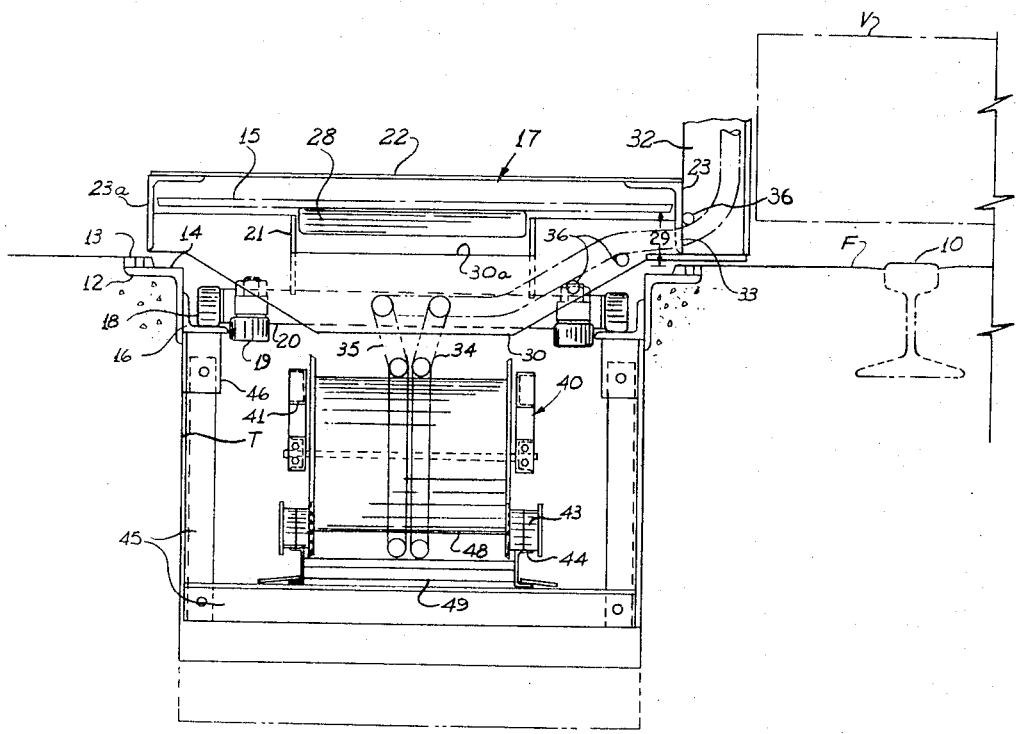
FIG. 3 is a cross-sectional view, taken substantially in the plane of the line 3—3 in FIG. 1.

Referring now to the accompanying drawings in detail, particularly to FIG. 3, the reference character F designates a floor on which a vehicle V is movable in a predetermined path, as for example along a track, one rail of which is shown at 10. FOr illustrative purposes the vehicle V may be assumed to be a large electric welding machine or manipulator which moves along the track 10 in order to reach different work stations, but for all practical purposes the invention may be used to supply electric, hydraulic or pneumatic power as required by any other type of a movable machine.

In accordance with the invention, a trench T is formed in the floor F, running parallel and closely adjacent to the track 10 of the vehicle V. Provided along opposite sides of the upper portion of the trench is a combined guide and rail structure including angle bars 12 having horizontal flanges to which are secured flat straps 13, the latter co-acting with the horizontal flanges to constitute guides 14 for seating a series of juxtaposed metal plates 15 which cover the entire trench. The plates 15 are rectangular and elongated transversely of the trench, and their end portions are normally seated in the guides 14. These guides are located so that when the plates 15 are seated therein, the upper surfaces of the plates are flush with the floor F. In the sense that the plates cover the trench and are flush with the floor, they may be referred to as floor plates. The plates 15 may be raised above floor level by means hereinafter described and preferably the guides 14 have bevelled inner edges at the straps 13 and the end edges of the plates 15 are complementally bevelled, as will be apparent from FIG. 3, so as to assist in seating the plates in the guides when the plates are lowered from their raised position.

The vertical flanges of the aforementioned angle bars 12 have secured thereto vertical flanges of angle bars, the horizontal flanges of the latter serving to provide rails 16 for a trolley designated generally by the numeral 17. As will be noted, the rails 16 are disposed at a level in the trench T somewhat below the guides 14, and the trolley 17 is movable along the rails 16 by means of horizontal-axis rollers 18 which ride on the upper surface of the rails, and vertical-axis rollers 19 which engage the inner edges of the rails to prevent lateral displacement of the trolley.

The rollers 18, 19 are supported by cross-pieces 20 which are spaced longitudinally in the direction of the trench and are welded to lower edges of elongated and transversely spaced vertical plates 21. In effect, the cross-pieces 20 with the plates 21 constitute a sub-frame of the trolley, which also has a superstructure 22 disposed above the floor level F. The superstructure 22 consists of a rectangular frame 23 which is secured to the plates 21 by braces 24, the top of the frame being covered by removable plates 25, 26, 25, as will be apparent from FIGS. 1 and 2.

Figure 1:
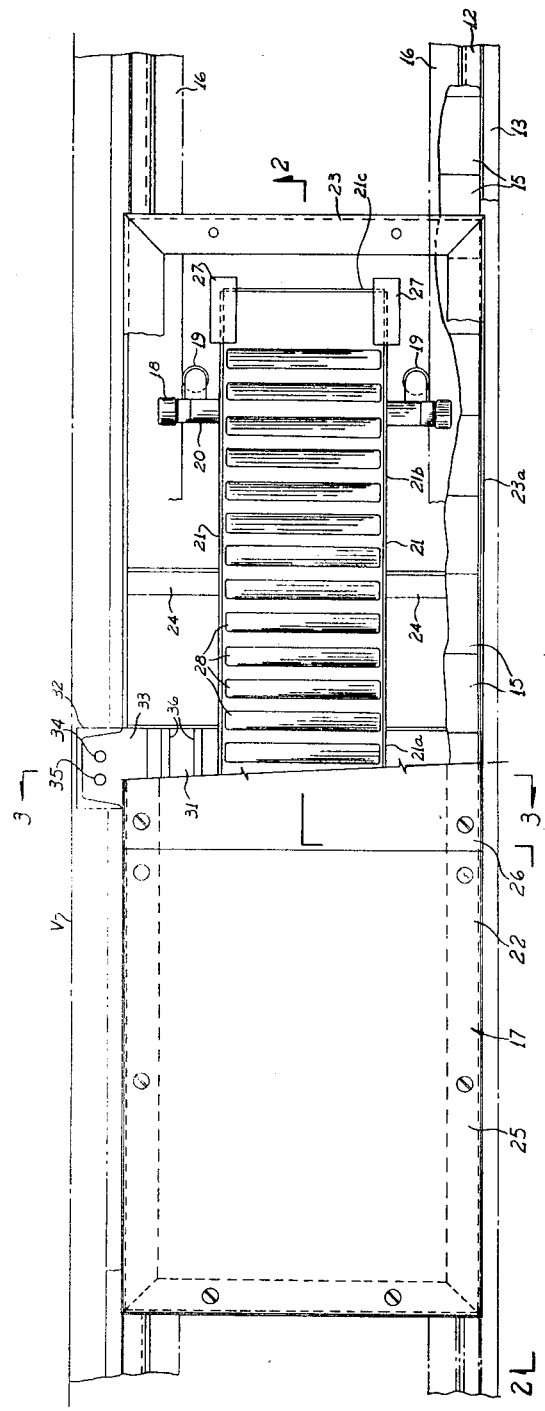
FIG. 1 is a top plan view of the power supply system of the invention, the right-hand portion of the view having some components omitted or broken away to reveal the underlying construction.
Figure 2:
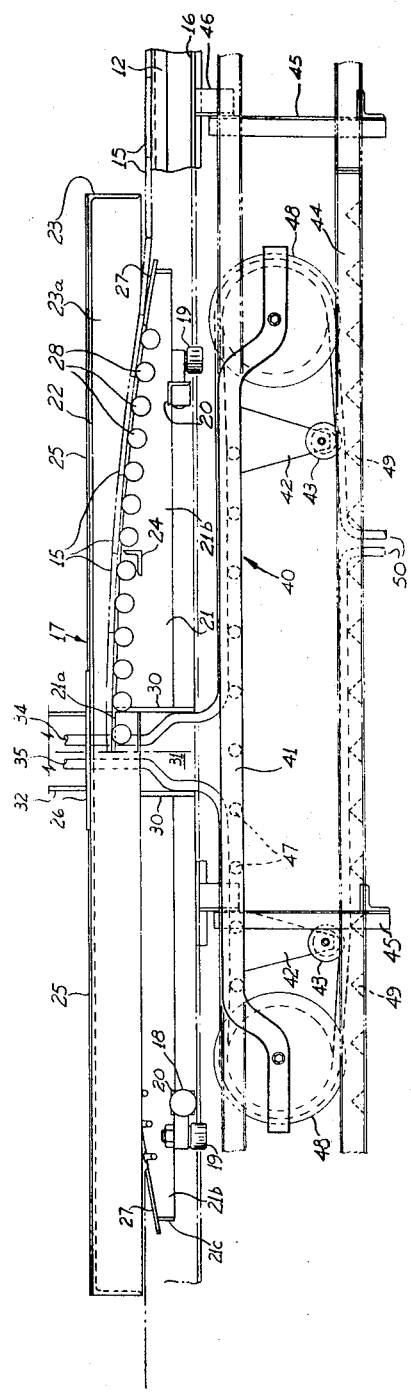
FIG. 2 is a view, partly in elevation and partly in vertical section, taken substantially in the plane of the line 2—2 in FIG. 1.

In side elevation, the plates 21 are shaped to provide a double-sloping hump on the trolley, the central crest region 21a of which projects above the floor F into the hollow superstructure 22 of the trolley, the hump also including a pair of sloping portions 21b which extend in opposite directions from the central crest portion 21a. For the most part, these sloping hump portions or regions 21b are still disposed within the superstructure 22, but as they gradually slope longitudinally outwardly in opposite directions, their terminal ends 21c lie well below the level of the guides 14 and below the floor plates 15 which normally rest in the guides. These terminal ends of the hump are preferably provided at the top thereof with sloping ramps 27 as shown in FIGS. 1 and 2, and both the sloping regions 21b and the central crest region 21a of the hump are provided with transversely extending rollers 28 which are rotatably mounted between the plates 21.

As already stated, the trench covering plates or floor plates 15 normally rest in the guides 14 so as to provide a flat, unobstructed continuity of the floor F across the trench T. However, at any given location of the trolley 17 along the length of the trench, the floor plates 15 are engaged and supported by the rollers 28 on the hump 21 of the trolley so that they are lifted off the guides 14 above the floor F, so that a space is created between the floor and the raised plates, as indicated at 29 in FIG. 3. Moreover, as the trolley 17 moves along the rails 16 in one direction or the other, the floor plates 15 become successively raised with the advance of the trolley and successively lowered when the trolley has passed, thus providing for progressive raising or lifting of the floor plates as the trolley travels along the entire length of the trench.

It is to be noted that the aforementioned ramps 27 at the terminal ends of the sloping hump regions 21b effectively assist in lifting the floor plates 15 off the guides 14 onto the rollers 28 of the hump. Also, once the floor plates are thus lifted and the rollers 28 of the trolley travel beneath them, lateral displacement of the lifted plates is prevented by the side members 23a of the superstructure frame 23, the transverse spacing of these side members being only slightly greater than the transverse dimension of the floor plates 15, as will be apparent from FIG. 3. Thus, the lifted plates are prevented from being displaced and assurance is had that they are properly deposited into the guides 14 after the trolley has passed, this being further facilitated by the complementally bevelled edges of the plates 15 and guide straps 13, as already noted. The removable cover plates 25, 26, 25 of the trolley superstructure afford convenient access to the interior if, for any reason, the floor plates 15 are not being properly raised and lowered, or otherwise require some manual adjustment.

The framework of the trolley 17 also includes a pair of transverse plates 30 which, as seen in FIG. 3, extend across the entire width of the trolley between the side members 23a of the superstructure frame 23 and are also secured to the longitudinal plates 21 of the hump. The plates 30 are cut away as at 30a to provide clearance for the rollers 28 and the lower portions of the plates project downwardly into the trench. As shown in FIGS. 1 and 2, the two plates 30 are in spaced parallel relation and the space between them defines what may be referred to as a duct 31 which extends transversely of the trolley below the central crest region 21a of the hump. A vertical channel 32 is secured exteriorly to one side of the frame 23 and the frame side member 23a at that point is cut away as at 33 so that the channel 32 communicates with the duct 31 between the plates 30 and constitutes an upward extension of the duct.

The duct 31 accomodates a power cable or conduit 34 which extends through the opening 33 in the side member 23a and upwardly through the channel 32 for connection to the electrical equipment of the manipulator or other vehicle V, it being understood that the entire trolley 17 is suitably connected to the vehicle V so that the trolley moves along the rails 16 concurrently with movement of the vehicle V along the track 10. It will be also noted that since the duct 31 and cable 34 are disposed below the central crest region 21a of the trolley hump where the floor plates 15 are at the highest elevation above the floor F, sufficient space exists at 29 between the floor and the raised plates for the cable 34 to pass freely from the inside of the trolley duct 31 into the channel 32 through the opening 33.

In addition to or instead of the power cable 34, a hydraulic or pneumatic hose 35 may be arranged in the duct 31 and channel 32 for connection to the vehicle V, if the operation of the latter requires fluid under pressure in addition to or instead of electric current. The power conduit 34 and the hose 35 may be anchored inside the duct 31 by suitable clamp means on one of the plates 30, and suitable cross bars 36 may be provided in the duct to support the power conduit and the hose on their passage into the channel 32, as will be apparent from FIG. 3.

A power supply is provided in the trench T and connected to the power cable 34 on the trolley, so that power may be delivered through the cable to the vehicle V while the trolley 17 moves along the rails 16 in company with the vehicle. Such a power supply in the trench may be of any conventional type, including a cable or cables which enter the bottom of the trench at a fixed point and are dragged along the trench in one direction or the other by movement of the trolley. Other conventional arrangements include a so-called hanging loop cable system, or a system of current collector shoes provided on the trolley and sliding along bus bars in the trench.

However, it is preferred to use another type of a power supply which is also conventional, this being a cable or hose handling device commercially known as the "CABLE-CART," which is manufactured by Ogden Engineering Corporation of Schererville, Indiana. While a detailed explanation of such a conventional "CABLE-CART" is not necessary here, a brief description thereof will now be given by way of one example of a cable or hose handling device in the trench whereby power may be supplied to the cable 34 and/or the hydraulic or pneumatic hose 35 on the trolley 17.

Figure 4:
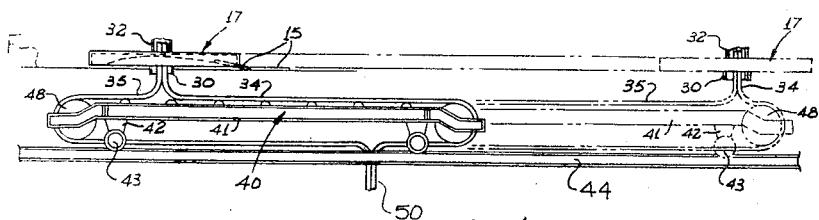
FIG. 4 is a diagrammatic elevational view showing one embodiment of the arrangement of cables or hoses from a source of supply to the trolley.

The cable cart 40 best shown in FIGS. 2 and 4 comprises an elongated chassis 41 with depending members 42 provided with wheels or rollers 43 which travel along tracks 44 extending horizontally in the lower portion of the trench T. Conveniently, the tracks 44 may be supported by suitable hangers 45 suspended from brackets 46 at the underside of the aforementioned rails 16. The cart chassis 41 is provided at the top thereof with a set of cable supporting rollers 47 and the ends of the chassis are equipped with a pair of cable drums 48. The cables or hoses 34, 35 extend downwardly from the duct 31 in the trolley 17, in opposite directions along the cart chassis 41, where they rest on the rollers 47 and then pass around the drums 48 at the ends of the chassis. The cables or hoses then pass under the trolley cart, where they are supported on suitable cross-members 49 between the tracks 44. Eventually, the cables or hoses leave the bottom of the trench T at a fixed point indicated at 50, for connection to the power supply.

The fixed exit point 50 of the cables or hoses is located at the longitudinal center of the trench T, and as shown diagrammatically in FIG. 4 the cable cart is one-half as long as the length of the trench, or in other words, one-half as long as the travel distance of the trolley 17 from one end of the trench to the other. Consequently, with the fixed point 50 of the cables or hoses being located centrally of the trench, when the cart 40 moves from left to right, the cables or hoses resting on the cross-members 49 of the tracks 44 are picked up around the left-hand drum 48 and move along the cart rollers 47 as the trolley 17 moves along the rails 16. At the same time, the cables or hoses on the right-hand side of the duct 31 move along the rollers 47 around the right-hand drum 48 and are deposited from that drum on the cross-members 49 of the tracks 44 on the right-hand side of the fixed point 50. The reverse, of course, occurs when the cart 40 moves from right to left. This brief description of the conventional cable-cart is presented merely to outline a preferred embodiment of the cable and hose handling device in the trench, and it will be understood that any other conventional power supply system may be used in place of it.

As to the invention itself, in operation, the power supply in the trench is conveyed to the conduit 34 and/or hose 35 on the trolley 17, passing through the space 29 between the floor F and the raised floor plates 15 to the accompanying vehicle V which may either stand still at some particular work station or may either stand still at some particular work station or may move along the track 10 concurrently with movement of the trolley along the rails 16. As the trolley moves along the rails in one direction or the other, the floor plates 15 become successively lifted off the guides 14 by the hump 21 on the trolley, and are then lowered into the guides when the trolley has passed, so that in any given position along the length of the trench, the raised floor plates create the space 29 for passage of the cable 34 and/or hose 35 from the inside of the trolley to the accompanying vehicle. With exception of the particular position of the trolley at any given time, the entire length of the trench T is covered by the floor plates 15 which are flush with the floor, so that the floor space across the trench is flat and unobstructed and the power supply in the trench is protected against dirt and mechanical damage.

If the cable cart 40 is used in the trench as already outlined, the movement of the cart along the tracks 44 is effected solely by the pulling action of the cables or hoses 34, 35 which extend to the cart from the duct 31 of the trolley 17.

While in the foregoing there has been described and shown the preferred embodiment of the invention, various modifications and equivalents may be resorted to within the spirit and scope of the invention as claimed.

The embodiments of the invention in which an exclusive property or privilege is claimed are defined as follows:

1. An underfloor power supply system for a powered vehicle which moves in a predetermined path along a floor, said system comprising: a trench provided in the floor extending longitudinally parallel to the vehicle path; a series of juxtaposed floor plates extending transversely and horizontally across the trench and covering the trench at floor level; a trolley movable longitudinally in the trench, said trolley including a hump projecting above the floor, plate engaging ends at the longitudinal edges of the hump and a support surface between the ends, said plate engaging ends including means for engaging the plates and raising them vertically as the trolley moves longitudinally along the trench so as to maintain the said transverse edges of the plates horizontal, and said support surface between the ends forming said hump and including means for raising successive plates vertically above the floor level after they are initially engaged and raised by the said ends, and upon further movement of the trolley along the trench, while maintaining the said transverse edges of the plates horizontal; and a power conduit extending from said trolley through a space between the floor level and the raised floor plates for connection to the vehicle, and a power supply in the trench connected to said power conduit in the trolley.

2. The system as defined in claim 1 together with guides extending along opposite sides of said trench at floor level, said floor plates normally resting on said guides.

3. The system as defined in claim 1 together with rails provided in said trench, said trolley traveling along said rails.

4. The system as defined in claim 1 wherein said hump of said trolley includes a central crest portion disposed above floor level, and sloping portions extending downwardly in opposite directions from said central crest portion.

5. The system as defined in claim 4 wherein said trolley also includes a hollow superstructure disposed above floor level and covering said hump, together with a duct for said power conduit provided at one side of said superstructure and extending downwardly below the central portion of the hump.

6. The system as defined in claim 5 together with supports for said power conduit provided in said duct.

7. The system as defined in claim 6 wherein said superstructure includes a pair of side members spaced apart by a distance slightly greater than the dimension of said floor plates transversely of the trench, said side pieces constituting means for preventing transverse displacement of the floor plates in their raised position.

8. The system as defined in claim 1 wherein said trolley includes a hollow superstructure disposed above floor level and covering said hump, the floor plates being successively raised into the hollow superstructure as the trolley moves along the trench.

9. The system as defined in claim 1 together with guides extending along opposite sides of said trench at floor level, said floor plates normally resting on said guides, the inner edges of the guides and end edges of the floor plates being complementally bevelled.

10. An underfloor power supply system for a powered vehicle which moves in a predetermined path along a floor, said system comprising a trench provided in the floor in parallel to the vehicle path, a series of juxtaposed floor plates covering said trench at floor level, a trolley movable longitudinally in the trench, a hump provided on said trolley and projecting above floor level, said floor plates being engageable by said hump and successively raised thereby above floor level as the trolley moves along the trench, a power conduit extending from said trolley through a space between the floor level and the raised floor plates for connection to the vehicle, and a power supply in the trench connected to said power conduit on the trolley, and wherein said trolley includes a hollow superstructure disposed above floor level and covering said hump, the floor plates being successively raised into the hollow superstructure as the trolley moves along the trench.

11. The system as defined in claim 10 wherein said support surface includes a set of transversely extending rollers provided on said hump of said trolley, said rollers being engageable with said floor plates.

* * * * *